United States Patent
Huh (10) Patent No.: US 11,491,966 B2
(45) Date of Patent: Nov. 8, 2022

(54) METHOD OF CONTROLLING UPHILL DRIVING OF VEHICLE

(71) Applicants: Hyundai Motor Company, Seoul (KR); Kia Motors Corporation, Seoul (KR)

(72) Inventor: Jee Wook Huh, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 177 days.

(21) Appl. No.: 16/952,279

(22) Filed: Nov. 19, 2020

(65) Prior Publication Data
US 2021/0323532 A1 Oct. 21, 2021

(30) Foreign Application Priority Data
Apr. 20, 2020 (KR) .................. 10-2020-0047220

(51) Int. Cl.
*B60W 20/13* (2016.01)
*B60W 10/06* (2006.01)
(Continued)

(52) U.S. Cl.
CPC ............. *B60W 20/13* (2016.01); *B60K 6/26* (2013.01); *B60K 6/387* (2013.01); *B60W 10/02* (2013.01);
(Continued)

(58) Field of Classification Search
CPC ...... B60W 20/13; B60W 10/02; B60W 10/06; B60W 10/08; B60W 30/18009; B60W 2510/0241; B60W 2510/1015; B60W 2510/244; B60W 2510/104; B60W 2540/10; B60W 2540/16; B60W 2552/15;
(Continued)

(56) References Cited

U.S. PATENT DOCUMENTS

2016/0221571 A1* 8/2016 Chen .................. B60W 10/26
2017/0197608 A1* 7/2017 Lee .................... B60W 20/13
(Continued)

FOREIGN PATENT DOCUMENTS

| JP | 2008094233 A | * | 4/2008 |
| JP | 2009023527 A | * | 2/2009 |

*Primary Examiner* — Roger L Pang
(74) *Attorney, Agent, or Firm* — Morgan, Lewis & Bockius LLP (57) ABSTRACT

A method of controlling uphill driving of a hybrid vehicle provided with a dual clutch transmission (DCT) may include determining, by a controller, a driving state of a vehicle on the basis of information collected from the vehicle; when the vehicle is determined as being in a uphill driving state, performing, by the controller, high torque control on an engine of the vehicle by increasing an engine torque to control the engine at a predetermined high torque engine operating point and reducing a motor torque of a motor in the vehicle to satisfy a driver request torque; and during the performing of the high torque control on the engine, comparing, by the controller, a state of charge (SOC) value of a battery with a set first SOC threshold value, and when the SOC value of the battery is less than or equal to the first SOC threshold value, performing engine and motor speed control to defend the SOC value of the battery.

18 Claims, 4 Drawing Sheets

(51) Int. Cl.
*B60W 10/08* (2006.01)
*B60W 10/02* (2006.01)
*B60K 6/387* (2007.10)
*B60K 6/26* (2007.10)
*B60W 30/18* (2012.01)
*B60W 10/113* (2012.01)

(52) U.S. Cl.
CPC ............ *B60W 10/06* (2013.01); *B60W 10/08* (2013.01); *B60W 10/113* (2013.01); *B60W 30/18009* (2013.01); *B60W 2510/0241* (2013.01); *B60W 2510/104* (2013.01); *B60W 2510/1015* (2013.01); *B60W 2510/244* (2013.01); *B60W 2540/10* (2013.01); *B60W 2540/16* (2013.01); *B60W 2552/15* (2020.02); *B60W 2710/021* (2013.01); *B60W 2710/0644* (2013.01); *B60W 2710/0677* (2013.01); *B60W 2710/081* (2013.01); *B60W 2710/083* (2013.01)

(58) Field of Classification Search
CPC ........... B60W 20/40; B60W 2710/021; B60W 2710/0644; B60W 2710/0677; B60W 2710/081; B60W 2710/083; B60W 2710/0666; B60W 2552/20; B60W 10/113
USPC ............................................................ 477/5
See application file for complete search history.

(56) References Cited

U.S. PATENT DOCUMENTS

| | | | |
|---|---|---|---|
| 2021/0061251 A1* | 3/2021 | Kimura | B60W 20/10 |
| 2022/0153253 A1* | 5/2022 | Nakashima | B60W 20/20 |

* cited by examiner

METHOD OF CONTROLLING UPHILL DRIVING OF VEHICLE

CROSS-REFERENCE TO RELATED APPLICATION

The present application claims priority to Korean Patent Application No. 10-2020-0047220 filed on Apr. 20, 2020, the entire contents of which is incorporated herein for all purposes by this reference.

BACKGROUND OF THE INVENTION

Field of the Invention

The present invention relates to a method of controlling uphill driving of a vehicle. More particularly, it relates to a method of controlling uphill driving of a vehicle, which is configured for securing a proper state of charge (SOC) value of a battery always by minimizing battery discharge during uphill driving and which is configured for minimizing energy consumption in an acceleration area.

Description of Related Art

Recently, as a transmission of a vehicle, application of a dual clutch transmission (DCT) configured for implementing a rapid gear shifting without power disconnection is increasing.

In the DCT, two input shafts provided to intermittently receive power through two clutches and two output shafts corresponding to the two input shafts form separate transmission mechanisms to alternately form a series of gear stages according to a gear ratio.

In the instant case, the dual-clutch transmission (DCT) is configured such that power of a vehicle driving source may be transmitted to one of the two input shafts, and the two input shafts, the two output shaft, and the two clutches are configured to implement shifting stages of odd stages and even stages among the series of gear stages.

Furthermore, a sequential and substantial gear shifting of the gear stages is performed by a torque handover in which one of the two clutches is engaged and the other thereof is released so that a phenomenon of torque degradation may be prevented during the gear shifting and the gear shifting may be completed.

Recently, the dual-clutch transmission (DCT) is also mounted in electrified vehicles such as a hybrid electric vehicle (HEV) and a plug-in HEV (PHEV), and to increase fuel efficiency of the electrified vehicles and provide more driving fun to drivers, application of the DCT is gradually expanding.

In the case of the HEV and the PHEV which are provided with the DCT, since two clutches are further present in addition to the conventional hybrid clutch, a degree of freedom of control is high.

However, owing to disadvantages of the HEV and the PHEV which are provided with a transmission mounted electric device (TMED) hybrid system, that is, degradation of a state of charge (SOC) value of a battery during uphill driving, there is a demand for an alternative to solve a problem of deterioration in driving ability and fuel efficiency.

Figure 1:
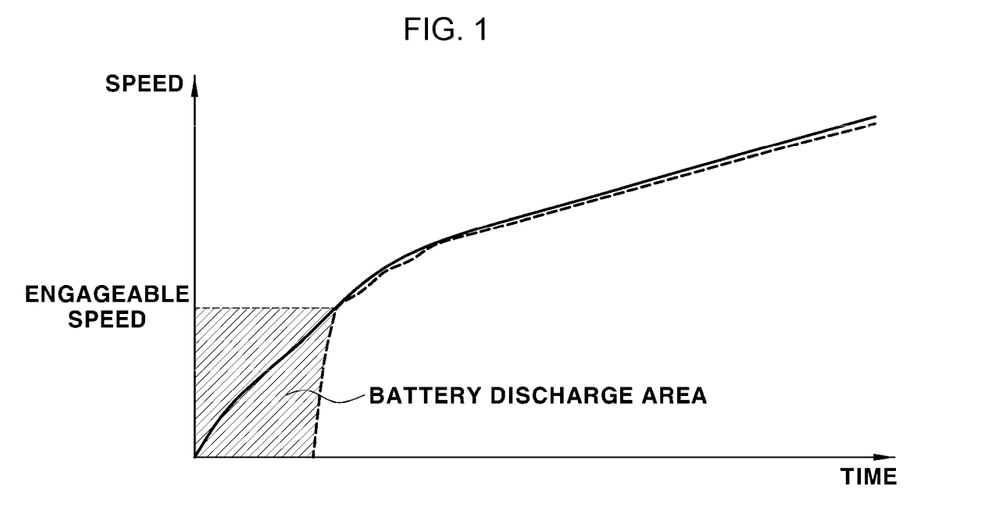
FIG. 1 is a graph illustrating that a battery discharge area may occur when a hybrid vehicle is driving on an uphill road.

To describe in more detail, when a minimum speed (RPM) at which an engine is controlled normally in an initial stage of vehicle acceleration in the TMED hybrid system is referred to as an engageable speed, a vehicle is accelerated at a speed which is higher than equal to or the engageable speed by engaging (locking up) an engine clutch and then using engine power. However, at a speed which is lower than the engageable speed, since a motor is responsible for vehicle acceleration, a battery discharge area is present as shown in FIG. 1.

Thus, when uphill driving in which a lot of power consumption of a battery is required is continuously performed, degradation in SOC may occur due to continued battery discharge.

When the vehicle is accelerated in a state in which the SOC value of the battery is low, the TMED hybrid system utilizes the engine power by slip-controlling the engine clutch. However, since a normal engine clutch does not have a sufficient slip capacity required as an acceleration clutch as well as, in the TMED hybrid system provided with the DCT, there is a case in which a lightweight material configured for only turning (engaging/separating) the engine clutch on/off is used so that there is a limitation in the use of the engine clutch.

Furthermore, when a driver operates a gear shifting in a manual gear shifting mode, a degree of freedom of control is reduced so that there is a limit in defense of the SOC value of the battery and a probability of occurrence of a problem is increased.

Figure 2:
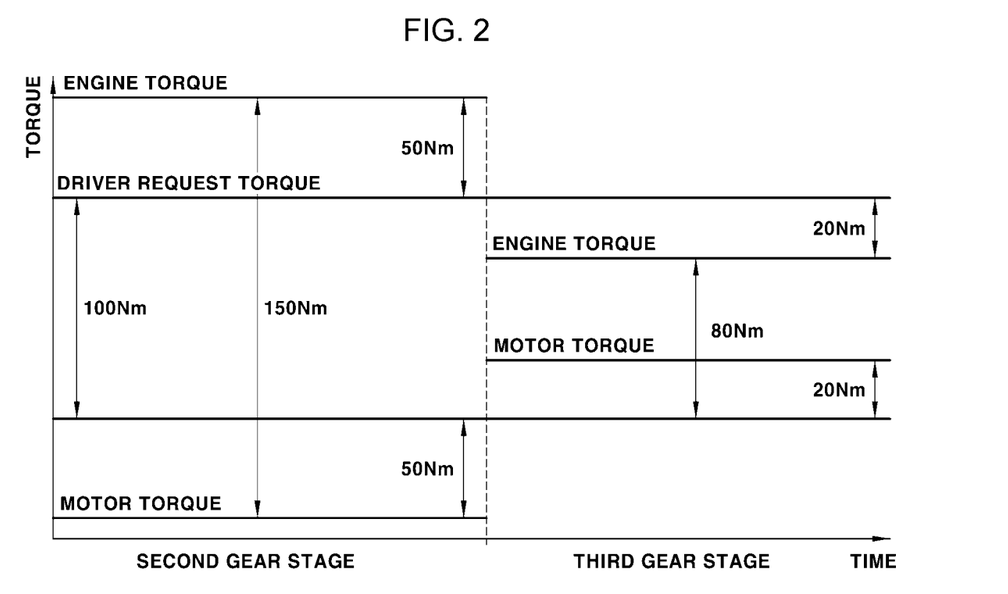
FIG. 2 is a diagram illustrating that discharge of a battery due to a motor may occur when the hybrid vehicle is driving on the uphill road and is gear-shifted.

For example, to describe with reference to FIG. 2, when a vehicle is driving in a second gear stage on an uphill road, since an engine torque (150 Nm) is greater than a driver request torque (100 Nm), the motor is operated as a generator with the remaining engine torque (50 Nm) (in the instant case, a motor torque is a negative torque of −50 Nm) so that the battery may be charged.

However, when the driver intentionally shifts to a third gear stage on the uphill road using the manual gear shifting mode and then drives the vehicle, since an engine torque (80 Nm) is smaller than a driver request torque (100 Nm), a motor torque (20 Nm) may be additionally generated to satisfy the driver request torque. In the instant case, the motor consumes power so that the battery is discharged.

When such a situation continues, the SOC value of the battery may be degraded below a limit level due to overdischarge of the battery, and thus a situation in which vehicle driving is impossible may occur.

Furthermore, owing to engine clutch slip in the manual gear shifting mode at a low speed (low RPM) during low-speed uphill driving, there may occur problems of excessive discharge of the battery and degradation in SOC and driving ability.

Furthermore, in the manual gear shifting mode, since a gear shifting timing cannot be predicted and thus it is impossible to cope with a gear shifting feeling, regenerative braking is limited, and during downhill driving, energy charging is almost impossible so that it becomes a factor causing degradation in fuel efficiency.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method of controlling uphill driving of a vehicle, which is configured for securing a state of charge (SOC)

value of a battery by minimizing battery discharge and which is configured for minimizing energy consumption in an acceleration area.

In another aspect, various aspects of the present invention provide a method of controlling uphill driving of a vehicle, which is configured for minimizing degradation in driving ability and fuel efficiency due to discharge of a battery and degradation in an SOC during uphill driving of a vehicle.

Objectives of the present invention are not limited to the above-described objectives, and other objectives of the present invention, which are not mentioned, may be understood by the following description and also will be apparently understood through embodiments of the present invention. Furthermore, the objectives of the present invention may be implemented by means described in the appended claims and a combination thereof.

In various exemplary embodiments of the present invention, various aspects of the present invention provide a method of controlling uphill driving of a hybrid vehicle provided with a dual clutch transmission (DCT), which includes determining, by a controller, a driving state of a vehicle on the basis of information collected from the vehicle; when the vehicle is determined as being in a uphill driving state, performing, by the controller, high torque control on an engine of the vehicle by increasing an engine torque to control the engine at a predetermined high torque engine operating point and reducing a motor torque of a motor in the vehicle to satisfy a driver request torque; and during the performing of the high torque control on the engine, comparing, by the controller, a state of charge (SOC) value of a battery with a set first SOC threshold value, and when the SOC value of the battery is less than or equal to the first SOC threshold value, performing engine and motor speed control to defend the SOC value of the battery.

Furthermore, the method of controlling uphill driving of a vehicle may further include, while the performing of the engine and motor speed control, comparing, by the controller, the SOC value of the battery with a set second SOC threshold value and determining that the SOC value of the battery is in a low SOC state when the SOC value of the battery is less than or equal to the second SOC threshold value; in the low SOC state, determining, by the controller, a DCT slippable speed from a capacity of the DCT and a current driver request torque and determining whether an engine speed reaches the determined DCT slippable speed; and when the engine speed reaches the DCT slippable speed, controlling, by the controller, an engine clutch between the engine and the motor to become in a locked-up state and slip-controlling the DCT clutch, operating the motor to generate electric power with surplus engine power which remains after driving the vehicle such that the battery is charged by the motor.

Furthermore, the method of controlling uphill driving of a vehicle may further include, before the engine speed reaches the DCT slippable speed, forcible engine charging, by the controller, the battery by operating a hybrid start generator (HSG) with the engine power to generate electric power when the engine clutch is in an open state.

In another exemplary embodiment of the present invention, when the vehicle is determined as being in the uphill driving state, the controller may be configured to determine whether a manual gear shifting mode is currently selected, and when the manual gear shifting mode is not selected, the controller may perform the high torque control on the engine by increasing the engine torque to control the engine at the predetermined high torque engine operating point and reducing the motor torque to satisfy the driver request torque.

In yet another exemplary embodiment of the present invention, when the manual gear shifting mode is selected, the controller may compare the SOC value of the battery with a set third SOC threshold value, and when the SOC value of the battery is less than or equal to the third SOC threshold value, the controller may be configured to control an engine clutch between the engine and the motor to become in a locked-up state and may control a DCT clutch to slip, operating the motor to generate electric power with surplus engine power which remains after driving the vehicle such that the battery may be charged by the motor.

Furthermore, in yet another exemplary embodiment of the present invention, while the battery is charged by the motor, when a discharge amount of the battery during a set time becomes greater than a predetermined third discharge amount reference value, the controller may execute a hill mode to forcibly release the manual gear shifting mode.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various exemplary features illustrative of the basic principles of the present invention. The specific design features of the present invention as included herein, includ-

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be fully described in a detail which is suitable for implementation by those skilled in the art to which various exemplary embodiments of the present invention pertains with reference to the accompanying drawings. However, the present invention is not limited to the exemplary embodiments included herein and may be implemented in other forms.

Throughout the present specification, when an element is referred to as "including" or "comprising" a component, it means that the component can further include other components, not excluding the other components unless stated otherwise.

Various aspects of the present invention provide a method of controlling uphill driving of a vehicle, which is configured for securing a proper state of charge (SOC) value of a battery always by minimizing battery discharge during uphill driving and which is configured for minimizing energy consumption in an acceleration area.

Furthermore, various aspects of the present invention provide a method of controlling uphill driving of a vehicle, which is configured for minimizing degradation in driving ability and fuel efficiency due to discharge of a battery and degradation in an SOC during uphill driving of a vehicle.

The present invention is applicable to an electrified vehicle which is driving with a motor. The present invention is applicable to a hybrid vehicle which is driving using an engine and a motor, and the present invention is applicable to a hybrid vehicle provided with a double clutch transmission (DCT) as a transmission.

Figure 3:
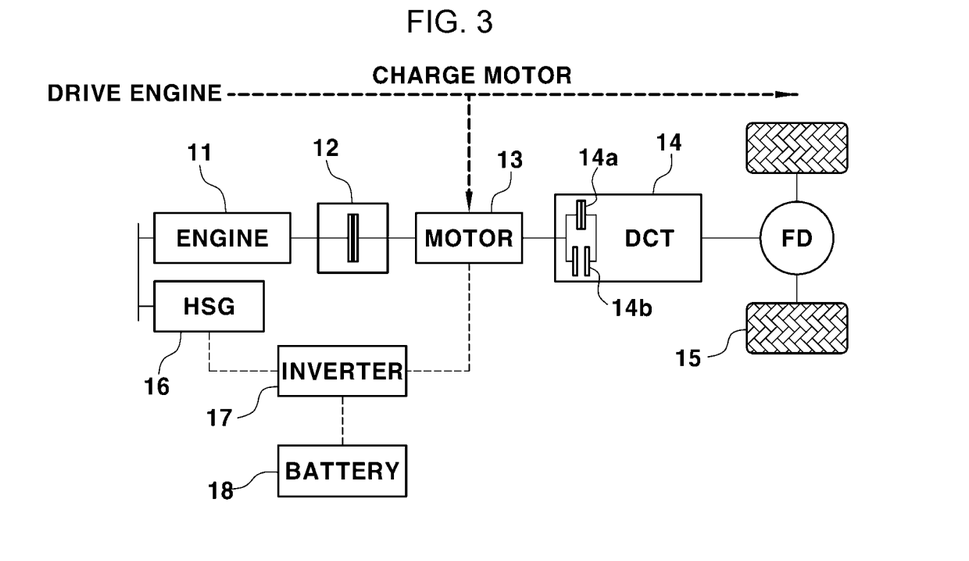
FIG. 3 is a diagram illustrating a configuration of a power train of a vehicle to which a method of controlling uphill driving according to various exemplary embodiments of the present invention is configured for being applied.

FIG. 3 is a diagram illustrating a configuration of a power train of a hybrid vehicle to which a method of controlling uphill driving according to various exemplary embodiments of the present invention is configured for being applied that shows a transmission mounted electric device (TMED) hybrid system of a vehicle provided with a DCT 14.

As shown in the drawing, the TMED hybrid system includes an engine 11 and a motor 13 which are driving devices for driving the vehicle, an engine clutch 12 mounted between the engine 11 and the motor 13, and the DCT 14 connected to an output side of the motor 13.

Furthermore, the vehicle includes a hybrid starter and generator (HSG) 16 which is a motor configured for starting the engine 11, an inverter 17 for driving and controlling the motor 13 and the HSG 16, and a battery 18 chargeably and dischargeably connected to the motor 13 and the HSG 16 via the inverter 17 as a power source (electric power source) of the motor 13 and the HSG 16.

In the TMED hybrid system, the motor 13 for driving the vehicle is power-transmittably connected to a drive wheel 15 through the DCT 14. Thus, the motor 13 may be driven with power of the battery 18 to provide a rotating force to the drive wheel 15, and contrarily, may receive a rotating force of the drive wheel 15 to generate power, charging the battery 18.

The engine clutch 12 performs a lock-up operation or an open operation to power-transmittably connect or separate between the engine 11 and the motor 13, and the DCT 14 varies a speed of rotating power transmitted from the motor 13 to transmit the rotating power to the drive wheel 15 through a driveshaft.

For driving of the motor 13 and the HSG 16, the inverter 17 is provided to convert a direct current (DC) current of the battery 18 into a three-phase alternating current (AC) current to apply the three-phase AC current to the motor 13 and the HSG 16, and during the driving of the motor 13 and the HSG 16, the battery 18 supplies power or is charged during a power generation operation of the motor 13 and the HSG 16.

Meanwhile, the present invention includes a control process of defending an SOC value of the battery 18 during uphill driving. To perform the control process of defending the SOC value of the battery 18, a controller 10 determines a situation in which the vehicle is currently uphill driving, performs engine high torque control to raise (increase) an engine torque in the case of the situation in which the vehicle is currently in a high load uphill driving, and defends the SOC value of the battery 18 through speed control with respect to the engine 11 and the motor 13 when the battery 18 is excessively discharged.

Here, the battery 18 is a battery provided in the vehicle, which supplies (or is discharged) driving power to the motor 13 and receives and stores (or is charged) power generated by the motor 13 while the motor 13 is operated as a generator. The SOC value (%) of the battery means a remaining capacity of the battery 18.

Furthermore, the defending of the SOC value of the battery 18 means a series of processes of maintaining and managing the SOC value of the battery 18 to not be degraded below a predetermined limit value.

In a hybrid system shown in FIG. 3, when power of the engine 11 is transmitted to the motor 13 through the engine clutch 12 in a driving state of the engine 11 and a lockup state of the engine clutch 12, the motor 13 may be operated as a generator due to the power of the engine 11 to charge the battery 18 ("motor charging").

Furthermore, the present invention includes an uphill driving control process when the battery 18 enters a low SOC. In the uphill driving control process, before a speed (RPM) of the engine 11 reaches a slippable speed of the DCT 14, forcible charging control with respect to the engine 11 is performed.

Here, the forcible charging control with respect to the engine 11 means a control for performing a series of processes in which the engine 11 is driven to operate the HSG 16 as a generator with engine power so that the battery 18 is charged by the HSG 16.

Furthermore, in the uphill driving control process when the battery 18 enters the low SOC, after the speed (RPM) of the engine 11 reaches the slippable speed of the DCT 14, clutches 14a and 14b (hereinafter referred to as "DCT clutches") in the DCT 14 are slippable so that the engine clutch 12 is locked upwards and the DCT clutches 14a and 14b are slip-controlled (one of the DCT clutches 14a and 14b is slip-controlled). Thus, a portion of the engine power is transmitted to the drive wheel 15 to drive the vehicle, and the motor 13 is operated as a generator with surplus engine power to charge the battery 18.

Furthermore, the present invention includes a control process for securing the SOC value of the battery 18 in an uphill driving manual gear shifting mode. In such a control process, the DCT clutches 14a and 14b are slip-controlled, and in the case of an excessive discharge amount of the battery 18, a hill mode is executed to forcibly release the manual gear shifting mode.

The method of controlling uphill driving of a vehicle according to various exemplary embodiments of the present invention may be performed by the controller in the vehicle. Hereinafter, the present invention will be described in more detail for each detail process performed by the controller.

Figure 4:
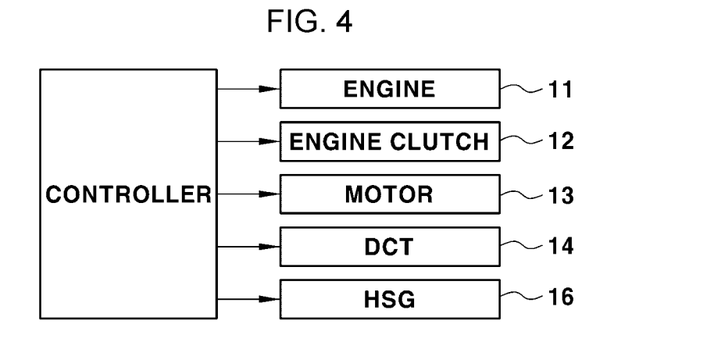
FIG. 4 is a block diagram illustrating a controller and a hardware configuration for performing uphill driving control of a vehicle according to various exemplary embodiments of the present invention.
Figure 5:
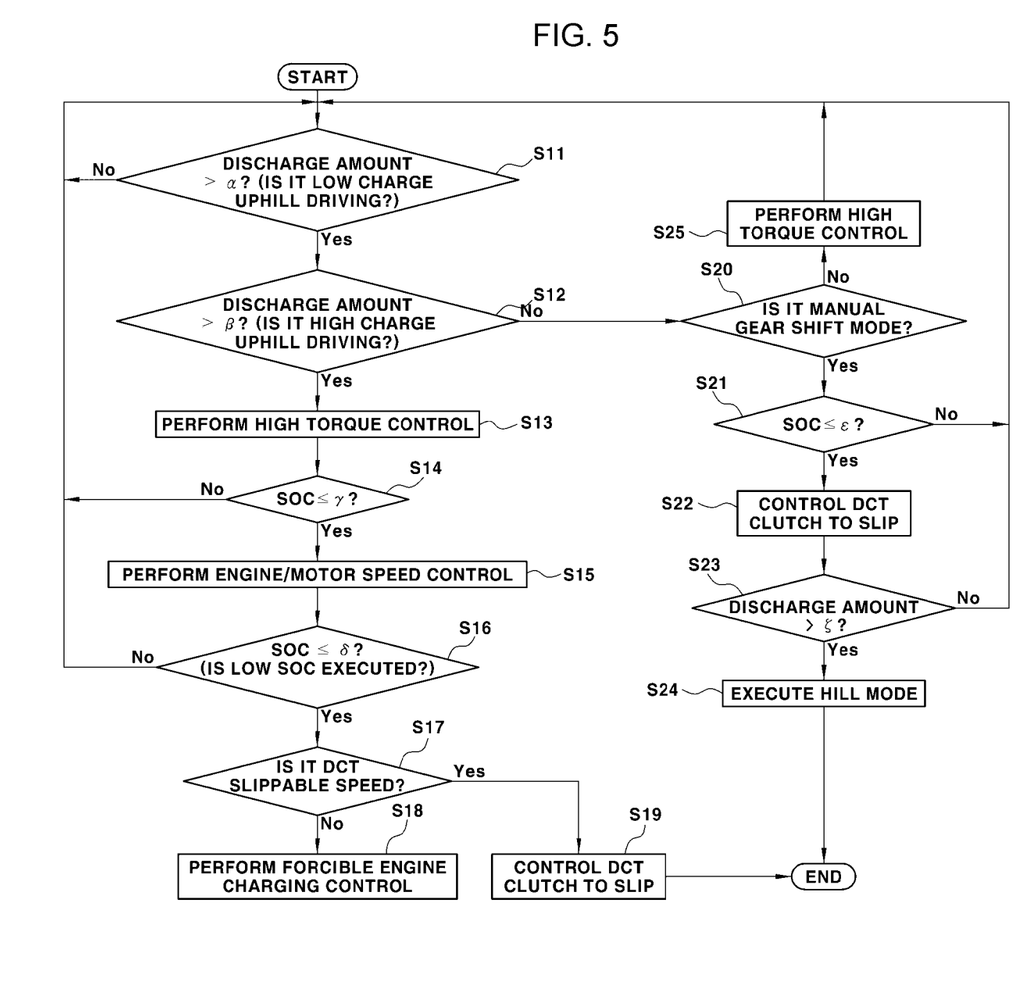
FIG. 5 is a flowchart illustrating the method of controlling uphill driving of a vehicle according to various exemplary embodiments of the present invention.

FIG. 4 is a block diagram illustrating a controller and a hardware configuration for performing uphill driving control of a vehicle according to various exemplary embodiments of the present invention, and FIG. 5 is a flowchart illustrating a method of controlling uphill driving of a vehicle according to various exemplary embodiments of the present invention.

Control Process of Defending SOC Value of Battery During Uphill Driving

First, the controller 10 determines a current driving state of the vehicle on the basis of information collected from the vehicle. The controller 10 determines whether the vehicle currently performs high discharge uphill driving or low discharge uphill driving.

In the instant case, the controller 10 compares a discharge amount ΔSOC value of the battery 18 during a set time with predetermined discharge amount reference values α and β (S11 and S12). When, during the set time, the discharge amount of the battery 18 is greater than or equal to a predetermined first discharge amount reference value α and is smaller than a predetermined second discharge amount reference value β, the controller 10 may determine that the vehicle is in a situation of the low discharge uphill driving.

Furthermore, when the discharge amount of the battery 18 during the set time is greater than or equal to the predetermined second discharge amount reference value β, the controller 10 may determine that the vehicle is in a situation of the high discharge uphill driving.

Here, the discharge amount of the battery 18 means an SOC variance ΔSOC of the battery 18. The discharge amount of the battery 18 means the SOC variance ΔSOC of the battery 18 in a discharge situation, that is, a decrease amount of the SOC value of the battery 18.

Furthermore, the discharge amount of the battery 18 during the set time may be a total discharge amount of the battery 18 during the set time or an average value of the discharge amount of the battery 18 (discharge power of the battery 18) during the set time. In the instant case, the average value may be an average value obtained by a moving average method.

The set time is a time to sufficiently determine a discharge situation of the battery 18 and is set in the controller 10. The first discharge amount reference value α may be set to a value corresponding to an SOC variation from a center SOC to an execution of a predetermined low SOC (a second SOC threshold value which will be described below), and the second discharge amount reference value β may be set to a value corresponding to the SOC variation from the center SOC to a predetermined idle charging execution SOC.

For example, the set time may be set to 100 seconds, the first discharge amount reference value α may be set to 12% based on the SOC value of the battery 18, and the second discharge amount reference value β may be set to 20% based on the SOC value of the battery 18.

In the instant case, when the SOC value of the battery 18 is degraded to be greater than or equal to 12% and to be less than 20% for 100 seconds, the controller 10 determines a low discharge uphill driving, and when the SOC value of the battery 18 is degraded to be greater than or equal to 20% for 100 seconds, the controller 10 determines a high discharge uphill driving.

The set time, the first discharge amount reference value α, and the second discharge amount reference value β are values set in the controller 10 in advance and are determined through a prior test and an evaluation process to be used after being input and stored in the controller 10. The above values are merely examples, the present invention is not limited thereto, and the above values may be variously varied.

Next, when the controller 10 determines a situation as the high discharge uphill driving, the controller 10 performs high torque control on the engine 11 (S13).

During the high torque control, a driver request torque is satisfied with an engine torque and a motor torque. The engine torque is increased to perform the high torque control at a predetermined high torque engine operating point, and simultaneously, the motor torque is reduced to satisfy the driver request torque.

In the instant case, an engine torque control is performed to direct the high torque engine operating point to converge on a preset Part-Load Max. line. Consequently, the engine 11 outputs a torque of a high level so that degradation in SOC value of the battery 18 due to driving of the motor 13 may be minimized.

The Part-Load Max. is defined as a maximum torque or maximum power when the engine is controlled at Lambda (λ) 1 (=the actual air-fuel ratio/the theoretical air-fuel ratio of the engine). That is, the region higher than the Part-Load Max. is when the engine is controlled at λ<1, whereas the region equal to or lower than the Part-Load Max. is when the engine can be controlled at λ=1.0.

Furthermore, during the high torque control, the controller 10 compares a current SOC value of the battery 18 with a preset first SOC threshold value γ (S14), and when the current SOC value of the battery 18 is less than or equal to the first SOC threshold value γ, the controller 10 performs speed control on the engine 11 and the motor 13 to defend the current SOC value of the battery 18 (S15).

Here, the first SOC threshold value γ may be set to an idle charging execution SOC value.

In various exemplary embodiments of the present invention, the engine and motor speed control is limitedly performed in a mode in which the SOC value of the battery 18 needs to be defended as much as possible. In a process of performing the engine and motor speed control, the controller 10 controls the engine clutch 12 in a locked-up (engaged) state and controls the DCT clutches 14a and 14b in a slip state.

Furthermore, when the process of performing the engine and motor speed control is executed, the controller 10 determines a target speed of the engine 11 as a speed obtained by adding a predetermined speed value A to an output speed of the DCT 14 and then controls a rotation speed of the engine 11 to the determined target speed during the process of performing the engine and motor speed control.

In the instant case, since the engine clutch 12 is in the locked-up state, a speed of the motor 13 is maintained to be equal to that of the engine 11, and while the vehicle is driving in the slip state of the DCT clutches 14a and 14b, a high speed of the engine 11 is maintained so that engine power may be sufficiently secured to minimize discharge of the SOC value of the battery 18.

That is, the control state is summarized as follows.
Engine clutch: lock-up
DCT clutch: slip Engine speed=motor speed=DCT output speed+A Here, the DCT output speed may be obtained from a signal of a wheel speed sensor mounted in the drive wheel 15, and A may be a speed value determined according to a DCT clutch capacity and may be determined in advance by a maximum speed difference between a transmission input speed and a transmission output speed according to the DCT clutch capacity.

Meanwhile, during the engine and motor speed control, the controller 10 compares the SOC value of the battery 18 with a preset second SOC threshold value δ (S16). In the instant case, when the SOC value of the battery 18 is less than or equal to the second SOC threshold value δ, the controller 10 determines that a low SOC state is executed to perform a predetermined uphill driving control process.

Here, the second SOC threshold value δ is set to a value which is smaller than the first SOC threshold value γ (that is, γ>δ).

2) Uphill Driving Control Process Upon Execution of Low SOC

When the controller 10 determines that the low SOC state of the battery 18 is executed, the controller 10 determines a DCT slippable speed at a current driver request torque according to the DCT capacity, and the DCT slippable speed may be determined by the following Equation 1.

DCT slippable speed=maximum DCT slippable speed difference−minimum engine speed  [Equation 1]

Here, the minimum engine speed is a speed (e.g., 1000 rpm) which is determined in advance according to the engine 11 and set in the controller 10, and the maximum DCT slippable speed difference may be determined by the following Equation 2.

Maximum DCT slippable speed difference=[DCT capacity (kW)−request power (kW)]/driver request torque (Nm)  [Equation 2]

Here, the DCT capacity is a value preset in the controller 10 and may be referred to as a DCT clutch capacity. However, since two clutches are present in the DCT 14, the DCT capacity may be varied according to which clutch is being used.

Furthermore, the request power is a value calculated according to an acceleration intent of a driver (e.g., an accelerator position sensor (APS) signal value), and a general vehicle is controlled by determining the request power according to the acceleration intent of the driver in the general vehicle.

As described above, when the DCT slippable speed is determined, the controller 10 compares a current engine speed with the DCT slippable speed to determine whether the engine speed reaches the DCT slippable speed (S17).

Figure 6:
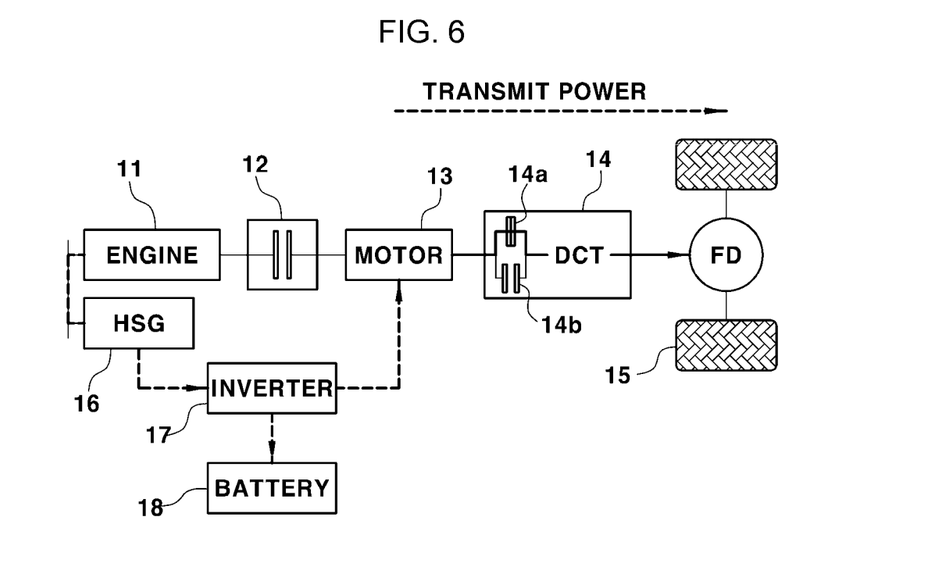
FIG. 6 and FIG. 7 are diagrams illustrating an uphill driving control state of the vehicle according to various exemplary embodiments of the present invention.

Here, before the engine speed reaches the DCT slippable speed, the slip of the DCT clutches 14a and 14b is impossible. Thus, as shown in FIG. 6, the controller 10 opens the engine clutch 12 and then performs forcible engine charging control (S18).

In the instant case, the controller 10 operates the HSG 16 to generate electric power as engine power, charges the battery 18 with the generated electric power of the HSG 16, and simultaneously, drives the motor 13 immediately, minimizing the loss of charging and discharge.

Furthermore, in a state in which the DCT clutch 14a is engaged, the controller 10 allows the motor power to be transmitted to the drive wheel 15 such that the vehicle may drive with the motor power.

Figure 7:
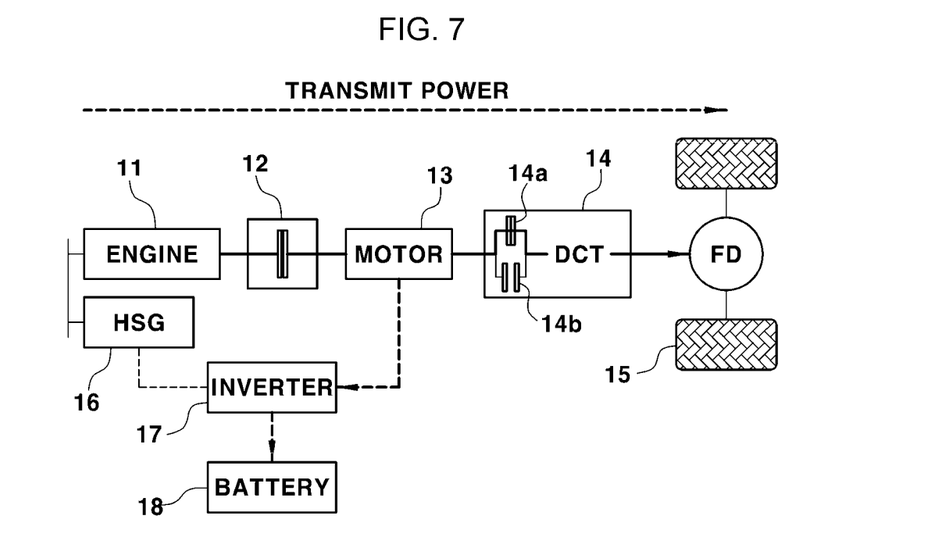

Furthermore, after the engine speed reaches the DCT slippable speed, the DCT clutches 14a and 14b are slippable. Thus, as shown in FIG. 7, the controller 10 controls the engine clutch 12 to be in the locked-up state and controls the DCT clutch 14a to slip (S19).

In the instant case, a portion of the engine power is transmitted to the drive wheel 15 so that the vehicle may drive, and the remaining energy, that is, surplus engine power may operate the motor 13 to generate electric power such that the battery 18 may be charged with the electric power generated by the motor 13.

3) Control Process of Securing SOC Value of Battery in Uphill Driving Manual Gear Shifting Mode Meanwhile, when the controller 10 determines the vehicle as being in a low discharge uphill driving state, that is, in S11 and S12, the controller 10 determines that the discharge amount of the battery 18 during the set time is greater than or equal to the first discharge amount reference value α and is less than the second discharge amount reference value β, the controller 10 determines whether the manual gear shifting mode is currently selected (S20).

Here, when the manual gear shifting mode is not selected, in S25, the high torque control with respect to the engine 11 is performed in the same manner as in S13.

Meanwhile, when a current state is a state of the low discharge uphill driving and the manual gear shifting mode, after an uphill driving manual gear shifting mode is executed, the controller 10 compares a current SOC value of the battery 18 with a third SOC threshold value ε (S21).

When the current SOC value of the battery 18 is less than or equal to the third SOC threshold value ε, the controller 10 performs DCT clutch slip control (S22).

Here, the third SOC threshold value ε may be set to a typical low SOC execution determination reference value, and when a capacity of the battery 18 is smaller than a normal level, the third SOC threshold value ε may be set to a value which is greater than or equal to the typical low SOC execution determination reference value.

The third SOC threshold value ε may be equal to or different from the above-described second SOC threshold value δ. When the third SOC threshold value ε is different from the second SOC threshold value δ, the third SOC threshold value ε may be greater than or equal to the second SOC threshold value δ.

As described above, in a low SOC state in which the current SOC value of the battery 18 is less than or equal to the third SOC threshold value ε, a gear shift is not arbitrarily performed and a speed stage required by the driver is maintained. In the instant case, as shown in FIG. 7, in a state in which the engine clutch 12 is locked upwards, the controller 10 controls the DCT clutch 14a to slip, and thus a portion of the engine power is transmitted to the drive wheel 15 such that the vehicle may drive. Meanwhile, the controller 10 operates the motor 13 to generate electric power with the remaining energy, that is, the surplus engine power such that the battery 18 may be charged with the electric power generated by the motor 13.

As described above, while the DCT clutch is slip-controlled, the controller 10 compares a discharge amount ΔSOC of the battery 18 during the set time with a preset third discharge amount reference value ζ (S23). When the discharge amount ΔSOC of the battery 18 during the set time becomes greater than the third discharge amount reference value ζ, the controller 10 executes the hill mode (S24).

Here, the discharge amount ΔSOC of the battery 18 during the set time may be defined to be equal to the discharge amount of the battery 18 during the set time in S11 and S12.

Furthermore, the third discharge amount reference value ζ may be the same value as one of the first discharge amount reference value α and the second discharge amount reference value β. Alternatively, the third discharge amount reference value ζ may be different from both of the first discharge amount reference value α and the second discharge amount reference value β.

For example, when the third discharge amount reference value ζ is set to 20% and the discharge amount ΔSOC of the battery 18 is greater than or equal to 20% with respect to the SOC value of the battery 18, the heel mode is executed.

Furthermore, in a state in which the hill mode is executed, even when the driver switches a gear shifting mode to the manual gear shifting mode, the controller 10 forcibly releases the manual gear shifting mode and performs gear shifting control according to a gear shifting map.

In the instant case, the controller 10 may be set to notify the driver, through a notification portion, that the manual gear shifting mode is forcibly released. For example, the controller 10 displays a release message, such as "the manual gear shifting mode is released due to excessive discharge of the battery," on a cluster to inform the driver of a current situation.

In the above description, although it has been described that the vehicle is currently determined as being in the situation of the high discharge uphill driving from the discharge amount of the battery 18 during the set time and then the high torque control is performed on the engine 11, or, when the vehicle is currently determined as being in the situation of the low discharge uphill driving from the discharge amount of the battery 18 during the set time, and simultaneously, the current state is determined as the manual gear shifting mode, the high torque control is performed, the controller 10 may be set to perform the high torque control on the engine 11 in S13 when the vehicle is in the uphill driving situation and a current mode is not the manual gear shifting mode without a detailed classification.

In the instant case, as described above, S14 to S19 may be performed after S13.

Furthermore, in the instant case, when the vehicle is in the uphill driving situation and is in the manual gear shifting mode, the controller 10 may be set to perform S21 to S24.

Furthermore, the controller 10 may determine whether the vehicle performs uphill driving from gradient information related to a current driving road, which is collected from the vehicle. The gradient (inclination) information related to the current driving road may be acquired from a signal of a sensor in the vehicle.

Here, the sensor may be a longitudinal acceleration sensor. While the vehicle is driving, the gradient information related to the current driving road may be acquired using a signal output from the longitudinal acceleration sensor.

A method and a process of acquiring the gradient information from the signal of the longitudinal acceleration sensor is a known technique which is well known to those skilled in the art, and thus detailed descriptions thereof will be omitted herein.

As described above, the method of controlling uphill driving according to various exemplary embodiments of the present invention may be applied to the hybrid vehicle provided with the DCT such that it is possible to adequately defend the SOC value of the battery during the uphill driving to minimize a full-load execution, and an idle charging area may also be reduced to improve fuel efficiency of the vehicle.

Furthermore, in the situation of the low SOC uphill driving, it is possible to preferentially perform the defense of the SOC value of the battery and minimize degradation factors of driving ability, such as an excessive engine penetration sound, occurrence of an impact due to low gear stage slip control, and the like, so that marketability of the vehicle may be significantly improved.

As described above, in accordance with a method of controlling uphill driving of a vehicle according to various exemplary embodiments of the present invention, it is possible to minimize discharge of a battery to secure a state of charge (SOC) value of the battery and minimize energy consumption in an acceleration area. Consequently, fuel efficiency of a vehicle may be improved and degradation in driving ability and the fuel efficiency due to the discharge and degradation in the SOC value of the battery may be minimized.

Furthermore, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable"

signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling uphill driving of a vehicle provided with a dual clutch transmission (DCT), the method comprising:
   determining, by a controller, a driving state of the vehicle according to information collected from the vehicle;
   upon determining that the vehicle is in a uphill driving state, performing, by the controller, high torque control on an engine of the vehicle by increasing an engine torque to control the engine at a predetermined high torque engine operating point and reducing a motor torque of a motor in the vehicle to satisfy a driver request torque; and
   during the performing of the high torque control on the engine, comparing, by the controller, a state of charge (SOC) value of a battery of the vehicle with a predetermined first SOC threshold value, and upon determining that the SOC value of the battery is less than or equal to the first SOC threshold value, performing, by the controller, engine and motor speed control to defend the SOC value of the battery.

2. The method of claim 1, wherein, in the determining of the driving state of the vehicle, the controller is configured to compare a discharge amount of the battery during a predetermined time with a predetermined discharge amount reference value to determine when the vehicle is in a high discharge uphill driving state, and upon determining that the vehicle is in the high discharge uphill driving state in which the discharge amount during the predetermined time is greater than or equal to the predetermined discharge amount reference value, the controller is configured to perform the high torque control on the engine.

3. The method of claim 1, wherein, in the performing of the high torque control on the engine, the controller is configured to control the engine torque with an engine operating point which converges on a Part-Load Max. line.

4. The method of claim 1, wherein, in the performing of the engine and motor speed control, the controller is configured to control an engine clutch between the engine and the motor to become in a locked-up state, configured to control a DCT clutch to become in a slip state, and configured to set a speed, which is obtained by adding a speed value according to a capacity of the DCT clutch to an output speed of the DCT, as a target speed of the engine, controlling an engine speed.

5. The method of claim 4, wherein the speed value according to the capacity of the DCT clutch is a maximum speed difference between a transmission input speed and a transmission output speed, which is determined according to the capacity of the DCT clutch.

6. The method of claim 1, further including:
   while the performing of the engine and motor speed control, comparing, by the controller, the SOC value of the battery with a predetermined second SOC threshold value and determining that the SOC value of the battery is in a low SOC state upon determining that the SOC value of the battery is less than or equal to the second SOC threshold value;
   in the low SOC state, determining, by the controller, a DCT slippable speed from a capacity of the DCT and a current driver request torque and determining when an engine speed reaches the determined DCT slippable speed; and
   upon determining that the engine speed reaches the DCT slippable speed, controlling, by the controller, an engine clutch between the engine and the motor to become in a locked-up state and slip-controlling a DCT clutch, operating the motor to generate electric power with surplus engine power which remains after driving the vehicle so that the battery is charged by the motor.

7. The method of claim 6, further including:
   before the engine speed reaches the DCT slippable speed, forcible engine charging operation of charging, by the controller, the battery by operating a hybrid start generator (HSG) with the engine power to generate electric power upon determining that the engine clutch is in an open state.

8. The method of claim 7, wherein, in the forcible engine charging operation, the controller is configured to engage the DCT clutch and drives the motor so that the vehicle drives due to motor power.

9. The method of claim 1, wherein, upon determining that the vehicle is in the uphill driving state, the controller is configured to determine when a manual gear shifting mode is currently selected, and upon determining that the manual gear shifting mode is not selected, the controller is configured to perform the high torque control on the engine by increasing the engine torque to control the engine at the predetermined high torque engine operating point and reducing the motor torque to satisfy the driver request torque.

10. The method of claim 9, wherein, during the performing of the high torque control on the engine, the controller is configured to control the engine torque with an engine operating point which converges on a Part-Load Max. line.

11. The method of claim 9, wherein, upon determining that the manual gear shifting mode is selected, the controller is configured to compare the SOC value of the battery with a predetermined third SOC threshold value, and upon determining that the SOC value of the battery is less than or equal to the third SOC threshold value, the controller is configured to control an engine clutch between the engine and the motor to become in a locked-up state and controls a DCT clutch to slip, operating the motor to generate electric power with surplus engine power which remains after driving the vehicle so that the battery is charged by the motor.

12. The method of claim 11, wherein, while the battery is charged by the motor, upon determining that a discharge amount of the battery during a predetermined time becomes greater than or equal to a predetermined third discharge amount reference value, the controller is configured to execute a hill mode to release the manual gear shifting mode.

13. The method of claim 2, wherein
the predetermined discharge amount reference value includes a second discharge amount reference value; and
in the determining of the driving state of the vehicle, in a response that the vehicle is determined to be in a low discharge uphill driving state in which the discharge amount of the battery during the predetermined time is greater than or equal to a predetermined first discharge amount reference value and is less than the second discharge amount reference value, the controller is configured to determine when the manual gear shifting mode is currently selected, and upon determining that the manual gear shifting mode is not selected, the controller is configured to perform the high torque control on the engine by increasing the engine torque to control the engine at the predetermined high torque engine operating point and reducing the motor torque to satisfy the driver request torque.

14. The method of claim 13, wherein, during the performing of the high torque control on the engine, the controller is configured to control the engine torque at an engine operating point which converges on a Part-Load Max. line.

15. The method of claim 2, wherein
the predetermined discharge amount reference value includes a second discharge amount reference value; and
in the determining of the driving state of the vehicle, in a response that the vehicle is determined to be in a low discharge uphill driving state in which the discharge amount of the battery during the predetermined time is greater than or equal to a predetermined first discharge amount reference value and is less than the second discharge amount reference value, the controller is configured to determine when a manual gear shifting mode is currently selected, and upon determining that the manual gear shifting mode is selected, the controller is configured to compare the SOC value of the battery with a predetermined third SOC threshold value, and upon determining that the SOC value of the battery is less than the third SOC threshold value, the controller is configured to control an engine clutch between the engine and the motor to become in a locked-up state and controls a DCT clutch to slip, operating the motor to generate electric power with surplus engine power which remains after driving the vehicle so that the battery is charged by the motor.

16. The method of claim 15, wherein, while the battery is charged by the motor, upon determining that a discharge amount of the battery during a predetermined time becomes greater than or equal to a predetermined third discharge amount reference value, the controller is configured to execute a hill mode to release the manual gear shifting mode.

17. The method of claim 1, wherein the controller includes:
a processor; and
a non-transitory storage medium on which a program for performing the method of claim 1 is recorded and executed by the processor.

18. A non-transitory computer readable medium on which a program for performing the method of claim 1 is recorded.

* * * * *